(12) United States Patent
Farago et al.

(10) Patent No.: US 8,005,857 B2
(45) Date of Patent: *Aug. 23, 2011

(54) OBJECT SEARCH UI AND DRAGGING OBJECT RESULTS

(75) Inventors: Julia H. Farago, Seattle, WA (US); Hugh E. Williams, Redmond, WA (US); James E. Walsh, Woodinville, WA (US); Nicholas A. Whyte, Mercer Island, WA (US); Kavi J. Goel, Danville, IL (US); Philip Fung, Sunnyvale, CA (US); Ariel J. Lazier, Seattle, WA (US); Kenneth A. Moss, Mercer Island, WA (US); Ethan N. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/630,500

(22) Filed: Dec. 3, 2009

(65) Prior Publication Data
US 2010/0083155 A1 Apr. 1, 2010

Related U.S. Application Data

(63) Continuation of application No. 11/353,787, filed on Feb. 14, 2006, now Pat. No. 7,664,739.

(51) Int. Cl.
*G06F 17/30* (2006.01)
*G06F 3/048* (2006.01)
(52) U.S. Cl. .................. 707/769; 715/769; 715/830
(58) Field of Classification Search .......... 707/769
See application file for complete search history.

(56) References Cited

U.S. PATENT DOCUMENTS

| 6,873,989 B1 * | 3/2005 | Martin, Jr. ............... 1/1 |
| 2002/0078019 A1 | 6/2002 | Lawton |
| 2003/0076352 A1 * | 4/2003 | Uhlig et al. ........... 345/738 |

(Continued)

FOREIGN PATENT DOCUMENTS

JP 2010198337 7/1998

(Continued)

OTHER PUBLICATIONS

Brad Miser, Special Edition Using Mac OS x v10.2, Jan. 3, 2003, Que, Chapter 15, and chapter 21.*

(Continued)

*Primary Examiner* — Don Wong
*Assistant Examiner* — Binh V Ho
(74) *Attorney, Agent, or Firm* — Shook, Hardy & Bacon L.L.P.

(57) ABSTRACT

A unique object navigation system, user interface, and method that facilitate faster and smoother navigation of objects are provided. For example, the system can generate a plurality of objects that can be rendered on a display space that spans a single page in length, thereby mitigating the need to navigate through multiple pages. The system can determine the length of the page according to the number of objects generated. To view off-screen objects, an infinite scroll component can be employed. The amount of scroll space needed to view the plurality of objects can be determined in part by the length of the page and/or by the number of objects. The objects can also be viewed in a film strip format that is infinitely scrollable. The film strip view allows a view of the objects to be maintained while also viewing a selected object in greater detail at the same time.

18 Claims, 9 Drawing Sheets

U.S. PATENT DOCUMENTS

| | | | |
|---|---|---|---|
| 2003/0139678 A1* | 7/2003 | Hoium et al. | 600/510 |
| 2005/0097475 A1* | 5/2005 | Makioka et al. | 715/792 |
| 2005/0270311 A1* | 12/2005 | Rasmussen et al. | 345/677 |
| 2006/0031214 A1* | 2/2006 | Solaro et al. | 707/4 |
| 2007/0050183 A1* | 3/2007 | Kao et al. | 704/3 |

FOREIGN PATENT DOCUMENTS

| | | |
|---|---|---|
| JP | 2003091450 | 3/2003 |
| JP | 2003345826 | 12/2003 |
| JP | 2004070809 | 3/2004 |

OTHER PUBLICATIONS

Brad Miser, Special Edition Using Mac OX × 10.2, Jan 3, 2003, Que Chapter 15, and chapter 21.*

"Starting up Your Mac, Basic operations of Mac," Appendix to Mac People, February edition, published by Ascil K.K. on Feb. 1, 2006, 7 pp.

* cited by examiner

OBJECT SEARCH UI AND DRAGGING OBJECT RESULTS

CROSS-REFERENCE TO RELATED APPLICATIONS

This application is a continuation application of Ser. No. 11/353,787, U.S. Pat. No. 7,664,739, filed on Feb. 14, 2006.

BACKGROUND

In general, searching has become a popular topic in the computing world in recent years. With users wanting and demanding faster processing speeds, more memory, and smarter computers, searching and a system's ability to return accurate results almost instantaneously may be viewed as an important aspect of the computer experience. Conventional search systems display or present search results in the form of a column or list to the user. Unfortunately, this format can be problematic for several reasons. The list may span several if not hundreds of pages which can be cumbersome and very time-consuming to page to follow the results. Thus, only a fraction of the results can be viewed onscreen at a time. When a particular result is clicked on for more-detailed viewing, only that result may be seen and the user has to continuously switch between screens to view either the results list or any selected result. Hence, the user cannot maintain the view of the other search results when looking at any one particular search result. Overall, navigating around search results tends to be clunky and slow using traditional navigation controls and techniques.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate viewing and manipulating search results. In particular, the application involves an improved user interface and enhanced navigation controls that when taken together, provide a smoother and more efficient search experience for a user. For example, web search results (e.g., objects) can be presented in a display space in a grid-like arrangement of multiple columns and rows. Contrary to traditional user interface and navigation means, the results are not paginated across multiple pages. Rather, they are essentially maintained on a single page, whereby the length of the page can depend in part on the number of objects. Thus, they can be scrolled through all at once mitigating the need to page over and over again to see more results. This unique scrolling component can also accelerate or decelerate through the object results based in part on the movement of the scroll bar. That is, moving the scrolling component faster or slower navigates through the object results faster or slower, respectively. Arrow keys and other typical navigation controls found on a keyboard or other input or pointing devices can also be employed to assist with the navigation or manipulation of the object results.

In addition, the search results can be returned in the form of individual thumbnails wherein each thumbnail represents a shrunken view of each result. Each thumbnail can be re-sized as desired such that some thumbnails may appear larger or smaller than others. The size of the thumbnails can determine the number of results visible onscreen at once. That is, increasing the dimensions of one or more thumbnails may decrease the number of thumbnails viewable at once in the display space. The object results can also be collectively or selectively zoomed in or out to facilitate the viewing of each object without having to actually click on any one object to enlarge its size in the display space. This can be accomplished manually by selecting a number of objects and choosing a different thumbnail size or it can be done in a continuous zoom. Navigation to more results can also be accomplished by grabbing the results page such as with a pointing device and then moving the pointer up or down and/or left or right.

The user interface can also be improved by allowing the user to view both the object results and a selected object result in greater detail at the same time. This can be accomplished in part by employing a film strip view of the object results along an edge of the screen, thereby leaving the remaining display space for viewing the selected object result. Again, the object results in the film strip can be scrolled infinitely mitigating the need to page repeatedly to navigate to additional results. Alternatively, these object results can also be grabbed and moved up or down or right or left to see more object results that are currently off-screen.

Search results can be in the form of various objects such as images, text, documents, sound and video files, and URLs. When performing an image search on the Web, for example, some of the images returned may be found on various web pages. Using conventional search and retrieval systems, it can be difficult to locate the image on the web page. The subject application provides an overlay of the image on the web page (the source of the image) which can improve the view-ability of the image while still maintaining a reference to its source. Otherwise, the image can be viewed in the web page or any page on which it is found. This can be applied to any object returned from a search such as text, documents, sound, video and URLs. For example, a search for the name of an author such as Ernest Hemingway may return thumbnail views of his numerous book covers, articles, images, and/or URLs having his name as a part thereof. One source of an article may be an American history website. Thus, a relevant portion of the article can overlay the website in which the article is found. An alternative view can be of the actual web page with the article. A drop-down screen or window can be employed as well to offer additional views of the object result aside from the current onscreen view. Therefore, if only the article is shown onscreen, then some additional views may include the article as seen in the webpage or the article overlaying the webpage. When dealing with an image of a car, for instance, the additional images may include a top view of the car, a side view of the car, a frontal view of the car, the car as viewed from the web page, the car alone, the car overlaying the web page on which it is found, etc.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
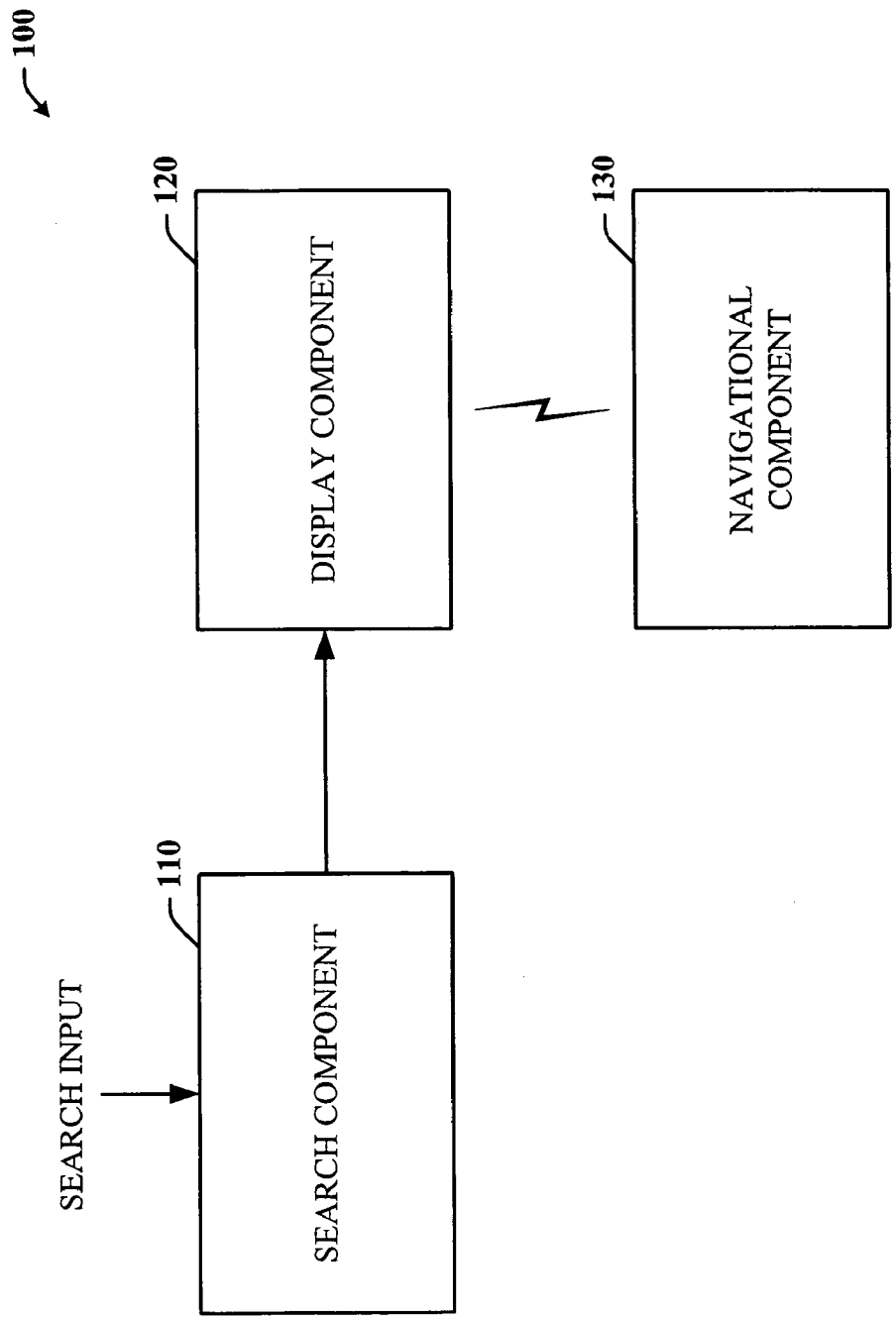
FIG. 1 is a block diagram of a navigation retrieval system that facilitates viewing and manipulating object results retrieved from a search of the Web or any other information or memory storage facility.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject application provides enhanced user interface and navigational controls to facilitate viewing and/or manipulating search results. The number of search results retrieved for a given search can vary tremendously. For example, one search may produce 100 results whereas most others may return tens of thousands results—a seemingly infinite number. Regardless of the actual number, many typical systems currently in use distribute the results across multiple pages as needed, whereby each page may be limited to 10 results, for instance. Consequently, multiple pages of results are often obtained and viewing them requires paging to the next page over and over again. Not only is this a slow and tedious task, several intermediate clicks or steps are often required in order to switch views between a selected object and the object results list.

The subject application mitigates these problems by providing for an infinite scrolling feature that allows the viewing of all or substantially all object results by scrolling up or down or right or left without the need to page to the next page repeatedly. This can be accomplished in part by dynamically computing an amount of scroll space needed according to the number of results returned. Thus, the amount of scroll space can be dynamically determined each time a search is performed and search results are returned to provide an accurate sense of position along the list of results.

This contrasts with traditional techniques in which a page of any content has a fixed length. Any content that exceeds this length is moved to a subsequent page; thus to view this content, a different page has to be opened or clicked on. Similarly, a conventional scroll bar is programmed to handle a set number of objects (e.g., lines, rows, or columns), or search results in this case, so that the user can retain a sense of position with respect to the entire page. For example, when the scroll bar positioner is positioned in the middle, then the user knows that he/she is at about mid-page and there is approximately a half-page more of content to view. When the full page is not viewable at once onscreen, then the scroll bar can navigate through the entire page to see more content located thereon. Navigating to view more results becomes more cumbersome and inefficient when multiple pages of objects exist. Conventional systems tend to be limited to navigation to one page at a time. Unfortunately viewing results one page a time in this manner can be costly in terms of time, effort, and energy. The subject scrolling technique alleviates this way of haphazard navigation by allowing the complete list of results to be scrolled through at once without stopping to page to another subset of results. It should be appreciated that the scrolling technique described herein can be applied to search results lists or any other content presented to the user in a column and/or row format. For the purpose of brevity and ease of discussion, the subject application will be discussed with respect to searching, retrieving objects, and presenting search results, though any computing task is suitable.

Referring now to FIG. 1, there is a general block diagram of a navigational retrieval system 100 that facilitates viewing and manipulating object results retrieved from a search. The system 100 can include a search component 110 that receives search input such as one or more search terms. The terms can be parsed and processed and compared to stored data. Relevant matches to the search terms can be returned and presented to the user via a display component 120. The display component 120 can display the search results to the user in a grid-like arrangement to optimize the number of object results visible in the available display space. In addition, the display component can render the results on a single page rather than across multiple pages. This can be accomplished in part by determining an appropriate length of the page given the number of results. Hence, the length of the page can vary each time a set of objects are generated.

One or more navigational components 130 can be employed to navigate and/or manipulate the objects in a smoother and more user-efficient way. The one or more navigational components 130 can include a scrolling component that can scroll through any number of objects from beginning to end without stopping to page up or down to a previous or next page to view a subsequent set of objects. Instead, the scrolling of the object results can be considered infinite—whereby the objects retrieved from the search are essentially distributed across a single page rather than across multiple pages.

Other navigational components 130 can also include a thumbnail size control. One or more thumbnails can be selectively chosen to change their dimensions while still retaining a view of at least a subset of any nearby thumbnails not chosen for the size adjustment. In addition to the thumbnail size control, each thumbnail can also be manually re-sized by dragging an actionable corner of the thumbnail inward or outward, upward or downward, or left or right. By altering the thumbnail size of each object based on manual input, the desired number of objects as well as the desired size of each object can be determined according to diverse user preferences.

Figure 2:
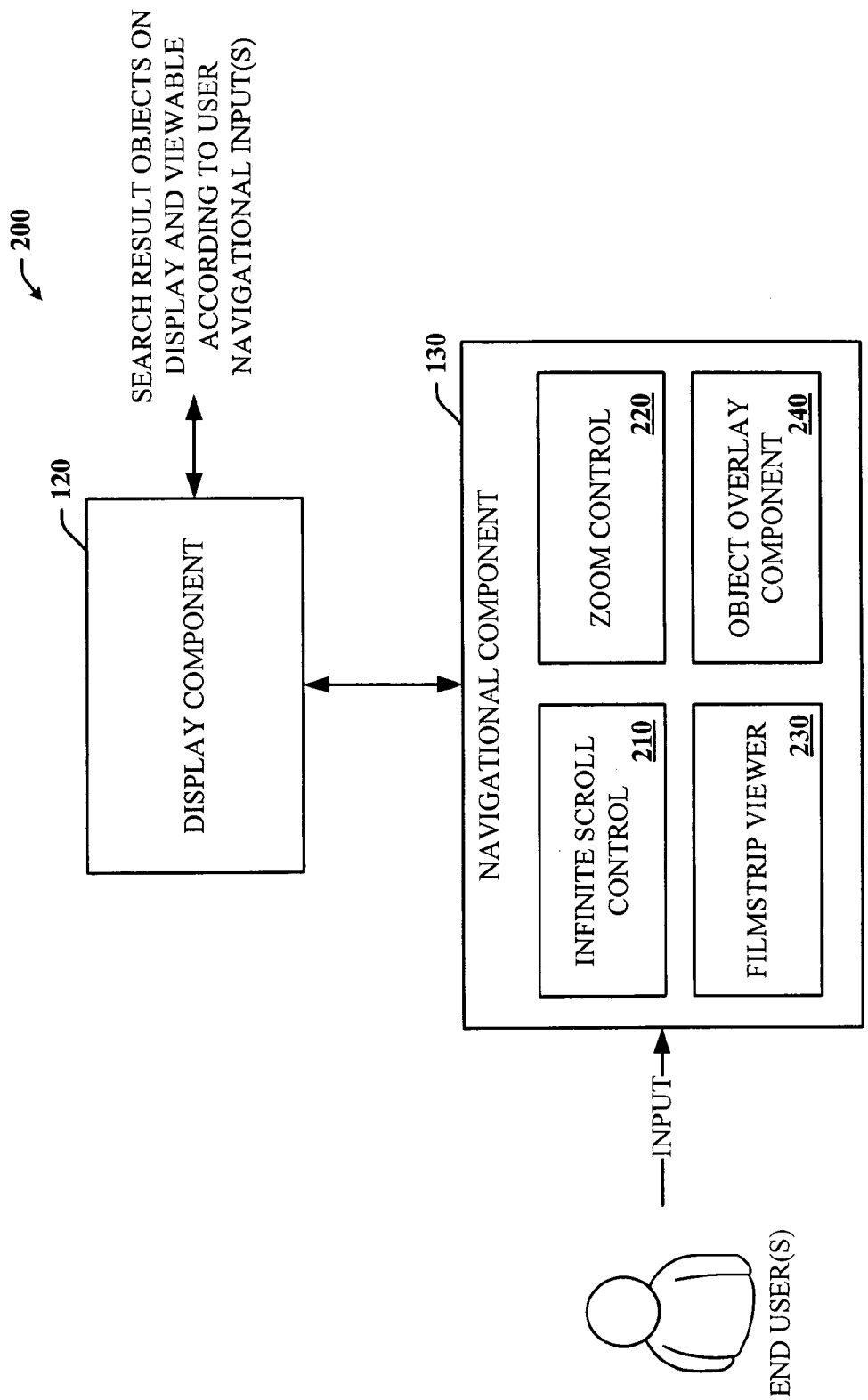
FIG. 2 is a block diagram of a navigation system that facilitates viewing and manipulating object results retrieved from a search of the Web or any other information or memory storage facility.

Referring now to FIG. 2, there is block diagram of a navigation system 200 that facilitates viewing and manipulating object results retrieved from a search of the Web or any other information or memory storage facility. The navigation system 200 includes a display component 120 as described in the previous figure. The display component 120 can present a plurality of objects or object results to a user for further viewing or manipulation such as by one or more navigational components 130. The operation of the one or more navigational components 130 can depend in part on input received from an end user. Examples of the navigational components 130 may include an infinite scroll control 210, a zoom controller 220, a film strip viewer 230, and/or an object overlay component 240.

The infinite scroll control 210 can dynamically compute an amount of scroll space needed to accommodate any number of object results or objects for which scrolling is desired. Consequently, an infinite number of objects can be scrolled through an infinite scroll space so that a large or small number of objects returned from a search, for example, can be readily viewed, thus mitigating the need to page up or down in order to navigate to see more results. Hence, the infinite scroll control 210 can substantially enhance an end user's computer experience by providing less costly and more efficient object viewing capabilities.

The zoom controller 220 can change the amount of zoom applied to the objects appearing onscreen or off-screen. For example, when zooming in on the objects, more detail can be seen among a reduced number of objects visible in the display space at the same time. Likewise, when zooming out, less detail can be seen among a higher number of objects that are visible onscreen at the same time.

The film strip viewer 230 can take advantage of the available onscreen display space by arranging the objects or object results in a film strip manner along an edge of the screen or display area. When the user selects an object to view in greater detail, the object can be selected and then appear larger in size in the display space. Therefore, the user can maintain a view of the objects as well as view a particular object in much greater detail at the same time. Alternative views of the selected object may also be available. These can appear in a drop-down window for quick and easy viewing by the user. In addition, the user may select a view from this drop-down and readily switch views. One of the alternative views includes an overlay of the object with respect to the source of the object (e.g., by the object overlay component 240). That is, suppose the object is an image of a vintage car which was found on multiple websites. Each image or object result can overlay its respective source so that the user can maintain a point of reference for the image in relation to the source (e.g., page on which it was found).

The following several figures represent exemplary user interfaces of the systems described above. It should be appreciated that other layouts of the various screen features may be possible or available and such are contemplated to fall within the scope of the subject application.

Figure 3:
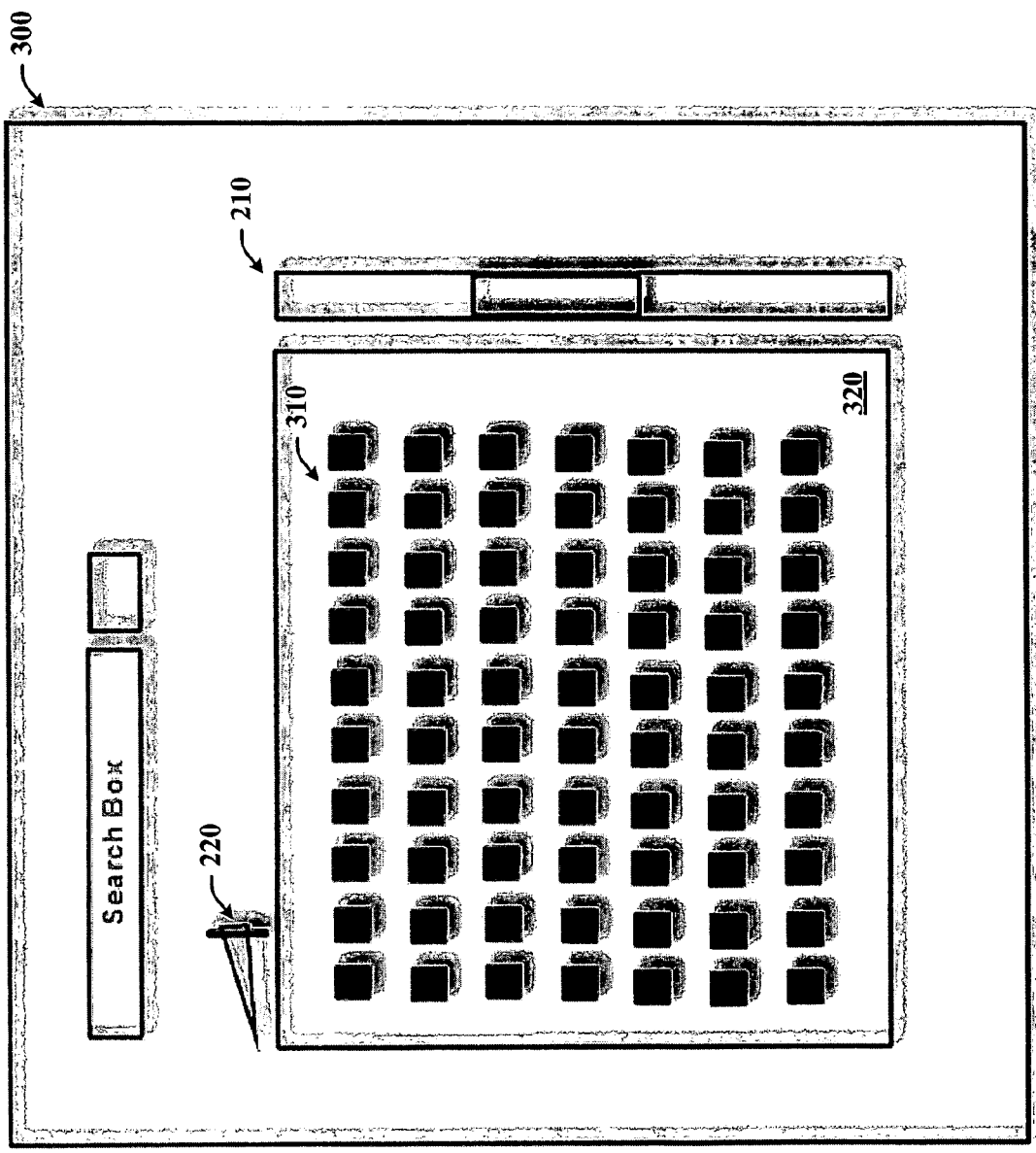
FIG. 3 is a schematic diagram of an exemplary user interface that demonstrates an arrangement of object results in a grid-like pattern which optimizes the number of objects visible at once in the display space.

Turning now to FIG. 3, there is a schematic diagram of an exemplary user interface 300 that demonstrates an arrangement of objects or object results 310 in a grid-like pattern which can optimize the number of objects visible at once in the display space 320. A zoom control 220 can appear onscreen as well to indicate the current relative zoom level. When positioned to the right as pictured in the figure, the zoom control 220 may indicate that the most number of objects are currently being viewed at the same time. In particular, the minimum zoom level may be determined by a minimum thumbnail dimension desired by the user and/or by the system (e.g., search and retrieval system). To navigate through the objects 310, an infinite scroll component 210 can be employed by moving the movable portion of the scroll component 210 up or down or right or left, depending on the orientation of the scroll component 210. When more objects exist than can fit onscreen or in the visible display space, the user interface typically can accommodate these additional objects by distributing them onto one or more additional pages and then noting each page to the user. However, due to the dynamic scrolling capabilities of the scrolling component 210, pagination of the objects is not necessary since the scrolling component 210 can be employed to scroll through all or substantially all objects since the objects are not separately located on different pages. This allows the user to view at most all of the objects by a continuous scroll action, rather than having to scroll down to the end of a page, navigate to another page, scroll through that page, and so on.

Figure 4:
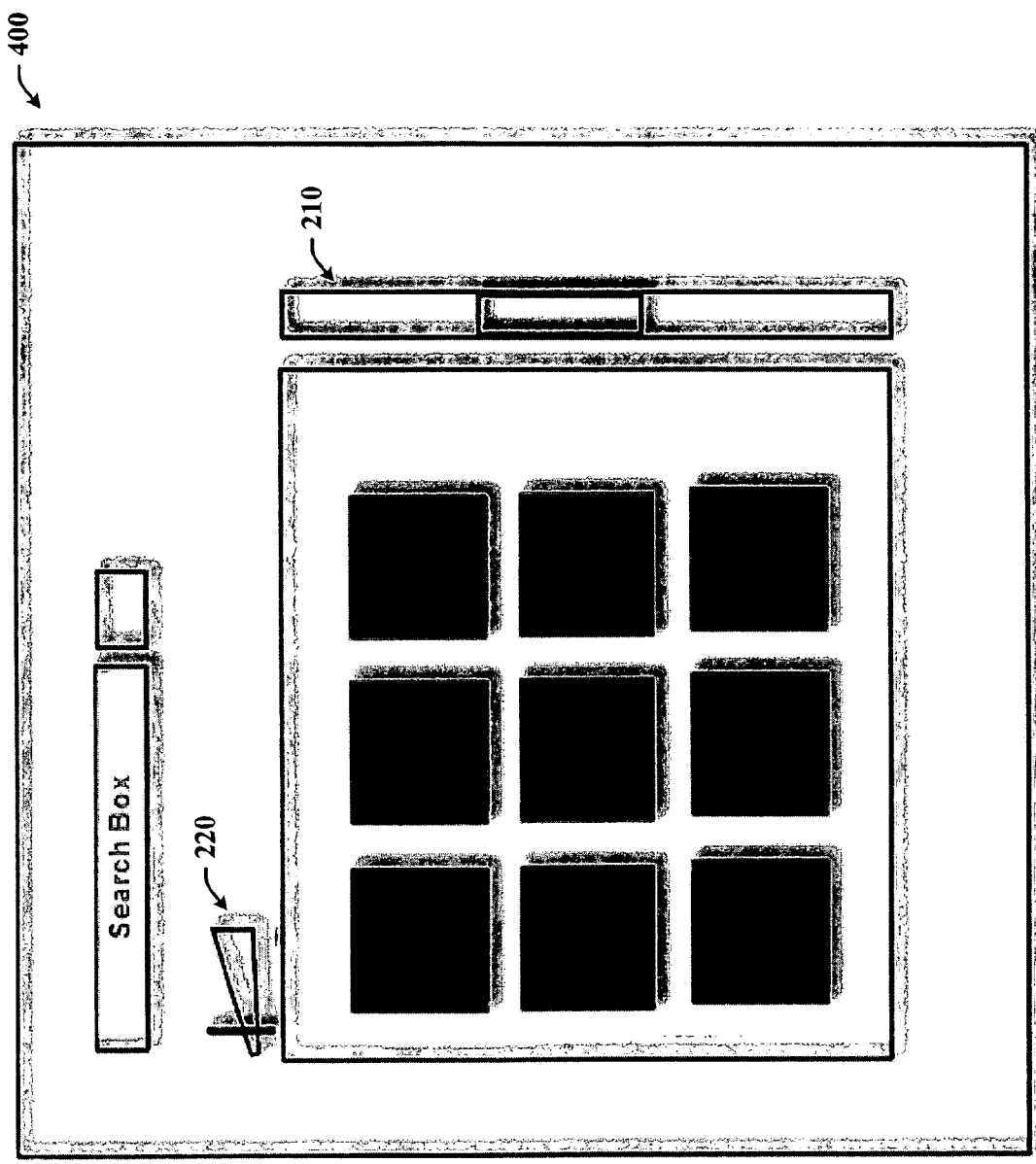
FIG. 4 is a schematic diagram of an exemplary user interface that demonstrates a zoomed in view of the object results as shown in FIG. 3 which assists the user in viewing fewer object results at one time but each object can be viewed in more detail.

Turning now to FIG. 4, there is a schematic diagram of an exemplary user interface 400 that demonstrates a zoomed in view of the object results 310 as shown in FIG. 3. By zooming in on the object results, fewer object results can be seen at one time but each object present in the display space can be viewed in more detail. The position indicator on the zoom control 220 has changed to indicate viewing fewer objects or object results but in more detail than before. Thus, in FIG. 3, there were 11 objects per row of results but here in FIG. 4, there are only 3 objects per row. After zooming, only 9 objects are currently visible in the display space at a time (in FIG. 4) compared to the 77 objects visible at the same time before zooming. Despite any alteration to the zoom control 220, the scrolling component 220 can dynamically adjust to function in its usual manner to smoothly scroll through the remaining objects.

Figure 5:
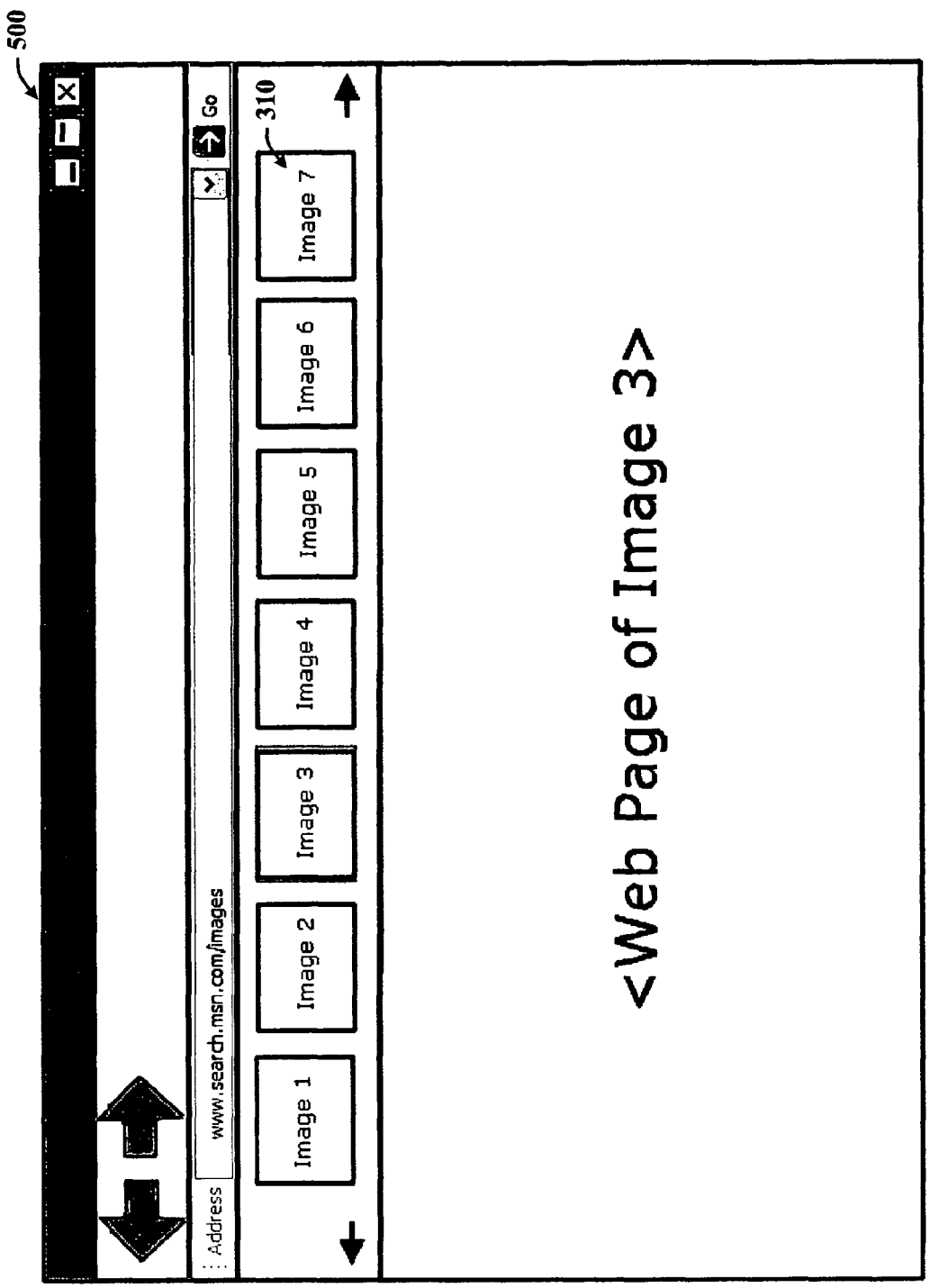
FIG. 5 is a schematic diagram of an exemplary user interface that demonstrates a film strip viewer for object results along an edge of a display space whereby a selected object can be viewed in much greater detail in the remaining area of the displace space.
Figure 6:
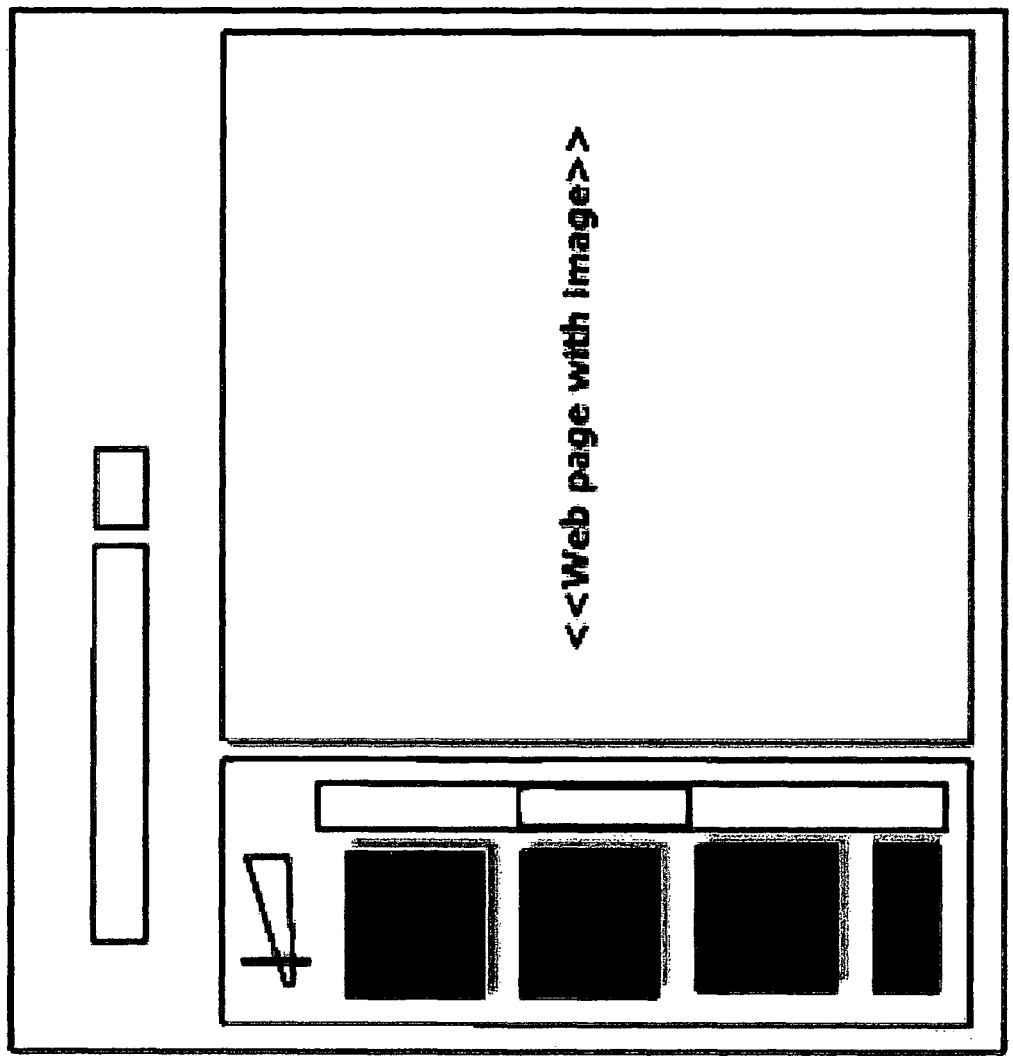
FIG. 6 is a schematic diagram of an exemplary user interface that demonstrates a film strip viewer for object results along an edge of a display space whereby a selected object can be viewed in much greater detail in the remaining area of the displace space.

FIG. 5 is a schematic diagram of an exemplary user interface 500 that demonstrates a film strip viewer 230 for object results along an edge of a display space whereby a selected object can be viewed in much greater detail in the remaining area of the displace space. In particular, any number of object results 310 is arranged by the film strip viewer 230. As shown in the figure, imagine that there are 7 images of a dog currently in the display space. There may be more to either side of these 7 images. To view them, the user can scroll through these thumbnails by using the scrolling component 210. Thumbnail views of each image can be maintained in the film strip view. Selected thumbnails can also be zoomed in or out to reduce or increase the number of thumbnails visible at the same time. This scenario is depicted in FIG. 6.

Figure 7:
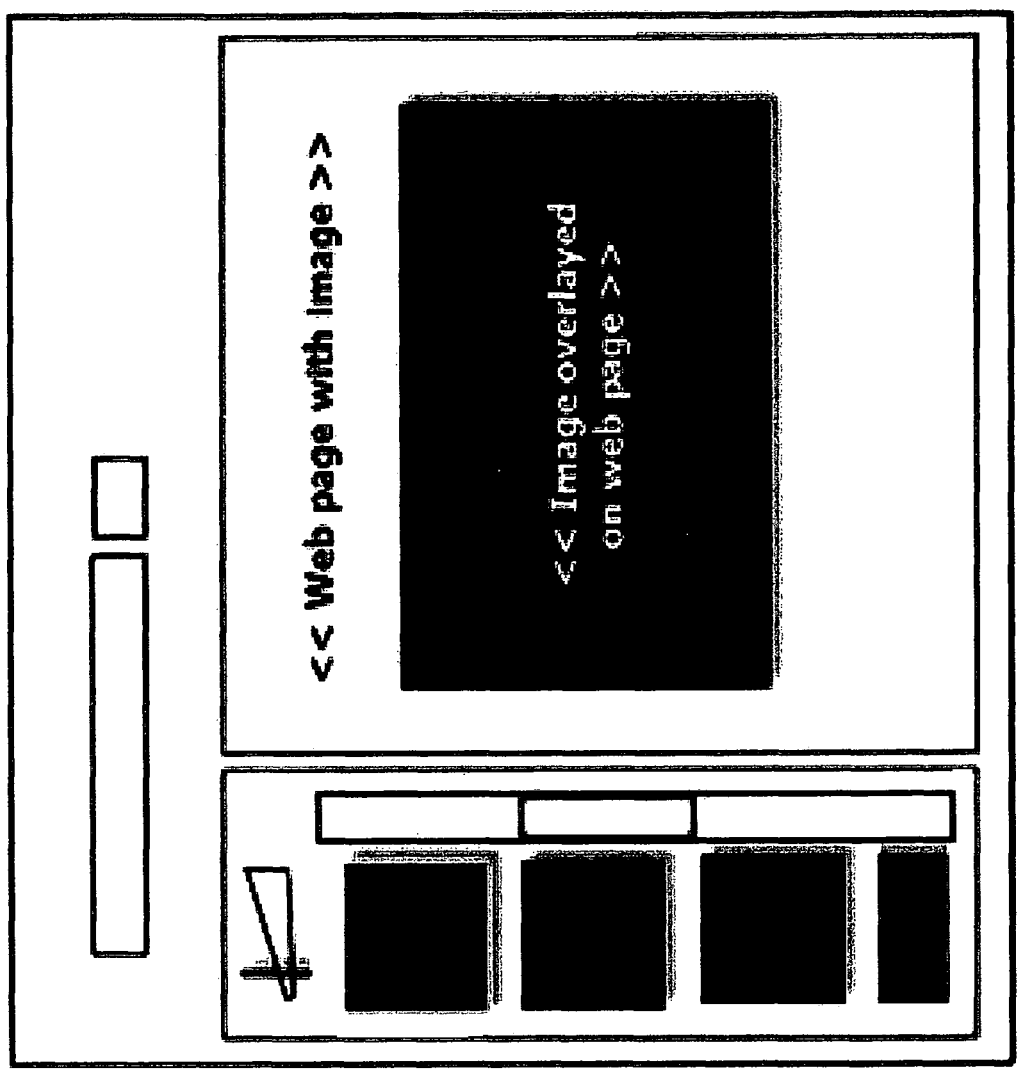
FIG. 7 is a schematic diagram of an exemplary user interface that demonstrates a film strip viewer for object results along an edge of a display space whereby a selected object can be viewed in much greater detail in the remaining area of the displace space.

When a user desires to see a more detailed view of the image, the image can be selected to appear in the other (larger) portion of the display space. For example, the user selects Image 3, thus a web page in which Image 3 can be found may appear in the display space. When the location of the image, in this case, (on a webpage) is not readily apparent to the user, the image (e.g., Image 3) can appear as an overlay over the source of the image. The overlay can obscure any content beneath it as depicted in FIG. 7 or can be transparent enough to retain a visual of the source.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 8:
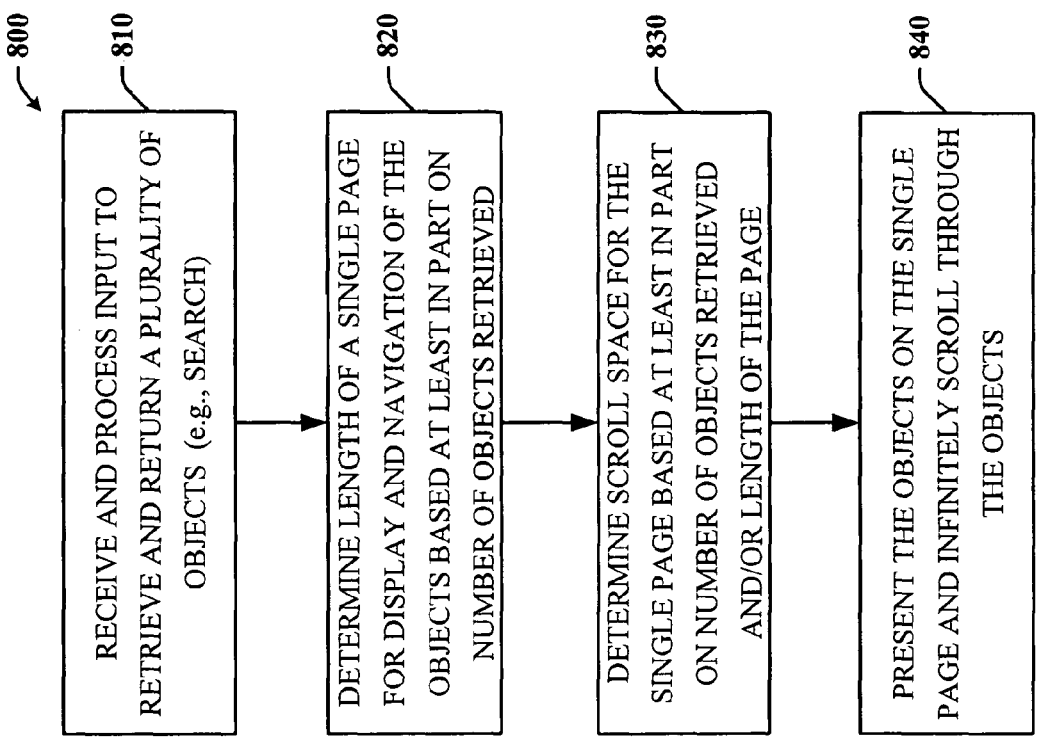
FIG. 8 is a flow diagram of an exemplary method that facilitates faster and smoother navigation of objects such as search results.

Referring now to FIG. 8, there is a flow diagram of an exemplary method 800 that facilitates faster and smoother navigation of objects such as search results. The method 800 involves receiving and processing input to retrieve and return a plurality of objects at 810. For example, imagine that a search of the Web is conducted using one or more search terms and a plurality of search results are obtained. Though the method 800 is discussed herein with respect to a search task, it should be appreciated that the method 800 can be employed to achieve faster and smoother navigation of objects with respect to any task or any set of objects that are presented for viewing and/or manipulation.

At 820, the method 800 can determine a length or an approximate length of a single page for display and navigation of the objects based at least in part on the number of objects retrieved or present. The scroll space for this single page can also be determined at 830 based at least in part on the number of objects retrieved and/or the length of the page. Thus, the length of the single page can change dynamically with each new or subsequent set of objects retrieved or returned by a search component. At 840, the objects can be presented on the single page and can be infinitely scrolled through in order to view all or substantially all of the objects—some of which may be off-screen. The length of this single page as well as the desired scroll space for this page can be determined in part by the number of objects retrieved for the search.

Figure 9:
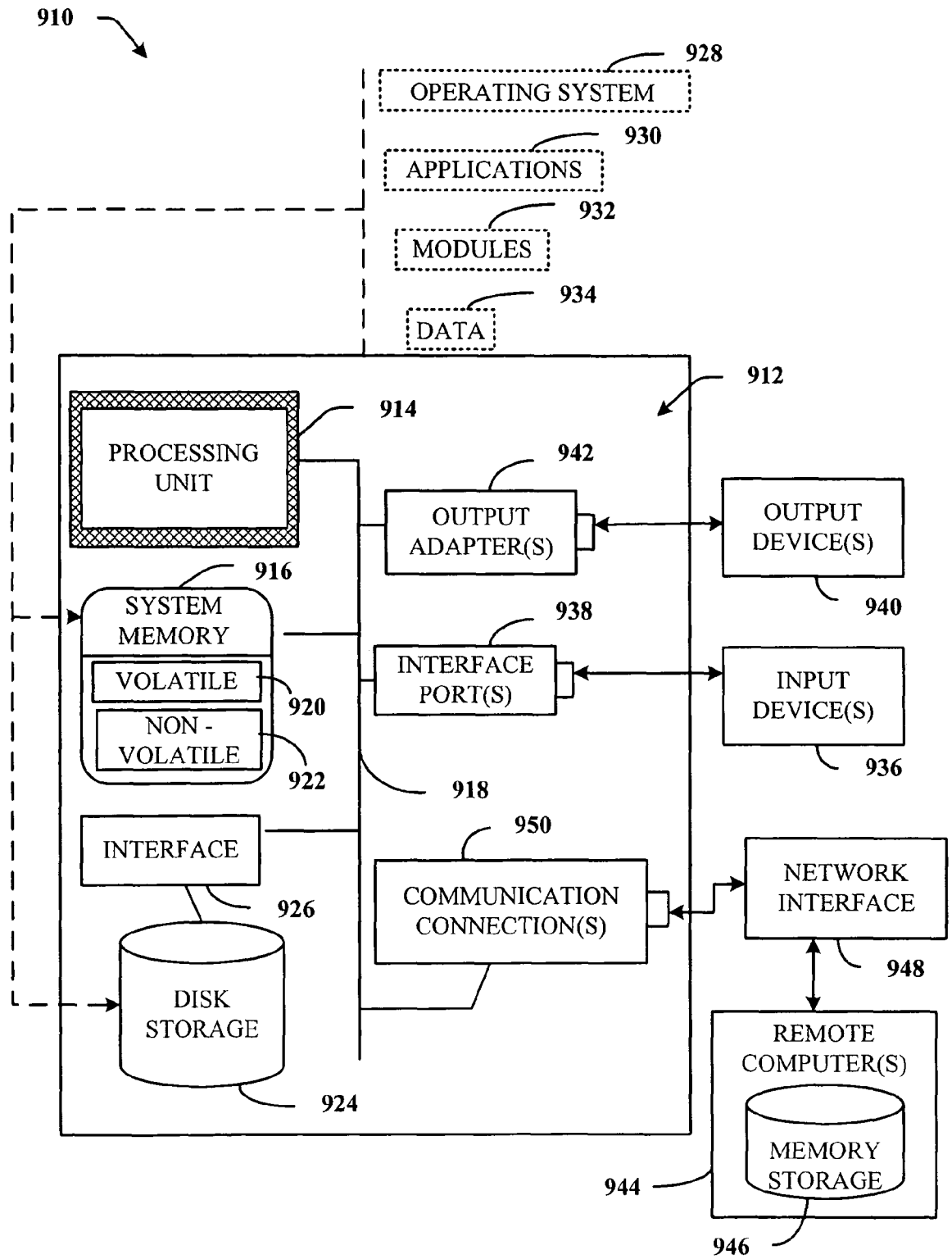
FIG. 9 illustrates an exemplary environment for implementing various aspects of the invention.

In order to provide additional context for various aspects of the subject application, FIG. 9 and the following discussion are intended to provide a brief, general description of a suitable operating environment 910 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the system and/or method includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912.

System applications 930 take advantage of the management of resources by operating system 928 through program modules 932 and program data 934 stored either in system memory 916 or on disk storage 924. It is to be appreciated that the subject system and/or method can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A search-result navigation system that includes a processor coupled to computer storage media and that facilitates viewing of search results, the system comprising:
   a search component that receives search input, which is used to return a plurality of thumbnails representing search results;
   a display component that presents the plurality of thumbnails in a first display space that is one page in length regardless of the number of search results, wherein the length of the page is dynamically determined to include each of the plurality of thumbnails and wherein the length of the page dynamically changes depending on a quantity of thumbnails identified in response to the search input; and
   navigational components that facilitate navigation and manipulation of the plurality of thumbnails, wherein the navigational components comprise:
   (1) an infinite-scroll component that dynamically determines an amount of scroll space necessary to view the plurality of thumbnails;
   (2) a zoom control that selectively zooms in or out on the plurality of thumbnails; and
   (3) an object-overlay component that, upon selection of a thumbnail from the first display space, displays a webpage in a second display space, wherein the webpage includes a presentation of the thumbnail that was selected, and wherein the object-overlay component persistently displays the thumbnail in a third display space, such that the system simultaneously displays the plurality of thumbnails, the webpage that includes the presentation of the thumbnail, and the thumbnail.

2. The system of claim 1, wherein the amount of scroll space necessary is based at least in part on the length of the page.

3. The system of claim 1, wherein the search results comprise images, text, web pages, URLs, and at least one of documents, sound files, video files, thumbnail images of book covers, articles, websites, perspective image views, or portions or edited versions of listed items.

4. The system of claim 1, wherein the thumbnails are distributed across the one page in length to mitigate paging to additional results located on one or more other pages.

5. The system of claim 1, wherein the one or more navigational components further comprises:
   a film strip viewer that arranges the plurality of thumbnails in at least one row or column at an edge of the first display space, leaving room in the first display space to view the selected thumbnail in greater detail while retaining a view of at least a subset of the plurality of thumbnails.

6. The system of claim 1, wherein the zoom control comprises a plurality of pre-set zoom commands that allow a user to select between different image sizes or a continuous zoom slider.

7. The system of claim 1, wherein one or more thumbnails can be individually re-sized to view more or less detail to an extent that more than one thumbnail remains onscreen.

8. A user interface that is rendered by a system including a processor coupled to computer storage media and that facilitates viewing thumbnail image search results comprising:
- a display component that presents a display space, which renders a plurality of thumbnail images representing image search results, the display space comprising:
  (1) a first area for displaying a film-strip view of the plurality of thumbnail images; and
  (2) a second area that displays, concurrently with the film-strip view, a webpage that includes a presentation of a selected thumbnail image of the plurality of thumbnail images, wherein the second area persistently displays an enlarged view of the selected thumbnail image, such that the plurality of thumbnail images, the webpage that includes the presentation of the selected thumbnail, and the enlarged view of the selected thumbnail image are simultaneously displayed;
- an infinite scroll component that dynamically determines an amount of scroll space needed to display the plurality of thumbnail images based at least in part on a determined length of a page to facilitate infinite scrolling through the plurality of thumbnail images, wherein the determined length of page dynamically changes depending on a quantity of thumbnails identified in response to search input; and
- a thumbnail size control that allows individual thumbnail images within the first area to be selectively.

9. The user interface of claim 8 further comprising, at least one zoom component that alters magnification of one or more thumbnail images to facilitate viewing at least one of the following: more thumbnail images at a time and less detail per image or fewer thumbnail images at a time and greater detail per image.

10. The user interface of claim 9, wherein the at least one zoom component comprises at least one of the following: a plurality of pre-set zoom commands that allow a user to select between different image sizes or a continuous zoom slider.

11. The user interface of claim 8 further comprising, at least one selection component that facilitates grabbing the display space within the first area and moving the display space in a desired scroll direction to view other search results in the display space.

12. The user interface of claim 8 further comprising, one or more navigational components that facilitate navigation of the display space and content therein, the components comprising one or more arrow keys, a page up key, and a page down key.

13. The user interface of claim 8, wherein the display space renders the plurality of thumbnail images on a single page regardless of the number of results.

14. The user interface of claim 8, wherein the infinite scrolling component is applied to the film-strip view to facilitate infinite scrolling from a beginning to an end of the plurality of thumbnail images in the film-strip view.

15. The user interface of claim 8 further comprising, a dropdown menu that facilitates switching between a full view of the display space corresponding to the page and a view of the display space segmented into the at least two display areas.

16. One or more computer storage media having stored thereon computer-executable instructions that, when executed by a computing device, cause the computing device to perform a method of presenting search results, the method comprising:
- receiving search input that is used to identify a plurality of thumbnails, each of which represents a search result;
- presenting the plurality of thumbnails in a first display space that is one page in length regardless of how many thumbnails are included in the plurality of thumbnails, wherein the length of the one page is dynamically determined to include the plurality of thumbnails, and wherein the length of the one page dynamically changes depending on a quantity of thumbnails identified in response to the search input; and
- navigating through the plurality of thumbnails, wherein navigating includes:
  - dynamically determining an amount of scroll space necessary to view the plurality of thumbnails, wherein an infinite scroll component facilitates scrolling the plurality of thumbnails; and
  - upon selection of a thumbnail from the first display space, displaying in a second display space a webpage that includes a presentation of the thumbnail, and persistently displaying another version of the thumbnail in a third display space, such that the plurality of thumbnails, the webpage that includes the presentation of the thumbnail image, and the other version of the thumbnail are simultaneously displayed.

17. The computer storage medium of claim 16, wherein the method further comprises:
- arranging the plurality of thumbnails in at least one row or column at an edge of the first display space, thereby leaving room in the first display space to view a selected thumbnail in greater detail while retaining a view of at least a subset of the plurality of thumbnails; and
- grabbing within the first display space and dragging the one page in a desired scroll direction to navigate to other thumbnails of the plurality of thumbnails.

18. The computer storage medium of claim 16, wherein the method further comprises:
- selectively zooming in on the thumbnails to present fewer thumbnails with more detail or zooming out from the thumbnails to present more thumbnails with less detail.

* * * * *